United States Patent [19]

Nankaku

[11] Patent Number: 5,500,898
[45] Date of Patent: Mar. 19, 1996

[54] SCRAMBLE COMMUNICATION SYSTEM MULTIPLEXING/DEMULTIPLEXING SCRAMBLE GENERATION POLYNOMIAL

[75] Inventor: Nagahiko Nankaku, Tokyo, Japan

[73] Assignee: NEC Corporation, Tokyo, Japan

[21] Appl. No.: 414,114

[22] Filed: Mar. 31, 1995

[51] Int. Cl.[6] .................................................. H04L 9/00
[52] U.S. Cl. .................... 380/43; 380/9; 380/21; 380/28; 380/42; 380/44; 380/49; 380/54; 370/19
[58] Field of Search ........................... 380/9, 21, 28, 380/42, 43, 44, 49, 50, 54, 59; 370/18, 19, 21, 22

[56] References Cited

U.S. PATENT DOCUMENTS

| | | | |
|---|---|---|---|
| 3,204,034 | 8/1965 | Ballard et al. | 370/21 |
| 4,052,565 | 10/1977 | Baxter et al. | 380/28 |
| 5,144,664 | 9/1992 | Esserman et al. | 380/28 X |

FOREIGN PATENT DOCUMENTS

| | | | |
|---|---|---|---|
| 57-103464 | 6/1982 | Japan | H04M 3/56 |
| 59-134939 | 8/1984 | Japan | H04L 9/00 |
| 63-10833 | 1/1988 | Japan | H04J 3/00 |

Primary Examiner—Bernarr E. Gregory
Attorney, Agent, or Firm—Sughrue, Mion, Zinn, Macpeak & Seas

[57] ABSTRACT

A scramble communication system comprises a station and a plurality of terminals connected to the station. The respective terminals are previously provided with specific scramble generation polynomials which are different from each other. In each terminal, its specific scramble generation polynomial is multiplexed with a transmission signal and the multiplex signal is transmitted to the station. In the station, the respective multiplex signals are received from the terminals and each the multiplex signal is divided into the specific scramble generation polynomial and the first transmission signal. The station scrambles a second transmission signal using the specific scramble generation polynomial obtained from the received multiplex signal. The scramble signal is transmitted from the station to all the terminals. Receiving the scramble signal from the station, each terminal descrambles the scramble signal by using its specific scramble generation polynomial. If the scramble signal has been scrambled using the same specific scramble generation polynomial, only the terminal can release the scrambling of the scramble signal.

9 Claims, 3 Drawing Sheets

SCRAMBLE COMMUNICATION SYSTEM MULTIPLEXING/DEMULTIPLEXING SCRAMBLE GENERATION POLYNOMIAL

BACKGROUND OF THE INVENTION

1. Field of the Invention

The present invention relates to a system for bi-directional communication between a station and a plurality of terminals, and more specifically to a scramble communication system which is capable of improving the secrecy of communication.

2. Description of the Prior Art

There have been proposed a variety of scramble communication systems which are designed to improve the secrecy of communication.

As a first example of such a scramble communication system, a voice conference system is disclosed in Japanese Patent Application Laid-open No. SHO 57-103464. The voice conference system is comprised of a loop transmission line to which a plurality of subscriber-terminals are connected. Each subscriber terminal is provided with a scrambler which is capable of selecting one of several scramble generator polynomials. By using the same scramble generator polynomial, secret communications can be made in a certain group of subscriber terminals.

A second example is a communication system employing encrypted data, which is disclosed in Japanese Patent Application Laid-open No. SHO 59-134939. This communication system is comprised of a plurality of digital terminals which are connected to each other through a digital subscriber circuit. According to this system, an encryption pattern used in a call is determined by the calling terminal and the called terminal transmitting an encryption pattern to each other.

A third example is a one-way TDM (Time Division Multiplexing) system described in Japanese Patent Application Laid-open No. SHO 63-10833. According to this system, in a transmission side, different channels (not all channels) are scrambled based on different generator polynomials, and in a receiving side, the respective channels are descrambled based on the same generator polynomials.

A bi-directional communication system having a configuration different from the three systems described above is illustrated in FIG. 1. Referring to the figure, optical signals transmitted from a plurality of terminals 1 are combined through a star coupler 2, and the combined signal is received by a station 3. In contrast, an optical signal transmitted from the station 3 is distributed through a star coupler 4 to all the terminals 1. Each terminal 1 is provided with an electric/optical signal converter 5 for converting a transmission signal to an optical signal, an optical/electric signal converter 6 for converting a received optical signal to an electric signal, and a descramble circuit 7 for releasing scrambling. The station 3 is comprised of an optical/electric signal converter 8 for converting a received optical signal to an electric signal, a scramble circuit 9 for scrambling a transmission signal, and an electric/optical signal converter 10 for converting the scrambled signal to an optical signal.

For transmitting a signal from the station 3 to the terminals 1, the signal is first scrambled by the scramble circuit 9 using a predetermined scramble generator polynomial. The scrambled signal is converted to an optical signal which is output to the star coupler 4. In this manner, the optical signal is distributed to the terminals 1 in which the received optical signal is descrambled using the same scramble generator polynomial as in the station 3 for reproduction of received data. Such a scramble system enables information distribution to all terminals which are provided in advance with the same scramble generator polynomial.

In the bi-directional scramble communication system, however, an optical signal is distributed from the station 3 to all terminals 1 though the star coupler 4, so that selective communications between the station 3 and one or more of the terminals 1 are impossible.

It is conceivable to apply a scrambler capable of selecting one of several scramble generator polynomials disclosed in the above first example to the station 3 of the bi-directional scramble communication system. However, in a kind of system having many subscribers such as a broadcasting system, a large number of scramble generator polynomials must be registered and stored in the station 3. For the same reason, the TDM scramble communication system as disclosed in the third example is not practical in such a system having a large number of subscriber terminals.

It is also conceivable to apply an encryption communication system disclosed in the above second example to the bi-directional scramble communication system. However, since the encryption pattern used in the communication must be determined by every terminal 1 and the station 3, a large number of subscriber terminals cannot be handled.

SUMMARY OF THE INVENTION

It is therefore an object of the present invention to provide a scramble communication system which is capable of ensuring selective communication between a station and a plurality of subscriber terminals with simple configuration.

It is another object of the present invention to provide a communication system which is capable of ensuring a bi-directional communication in secrecy between a station and one of a plurality of subscriber terminals without burdening the station.

The scramble communication system according to the present invention is comprised of a station and a plurality of terminals connected to the station. The respective terminals are previously provided with specific scramble generation polynomials which are different from each other. In each terminal, its specific scramble generation polynomial is multiplexed with a first transmission signal. The respective multiplex signals are transmitted from the terminals to the station. In the station, the respective multiplex signals are received from the terminals and each the multiplex signal is divided into a specific scramble generation polynomial and a first transmission signal. The station generates a second transmission signal in accordance with the first transmission signal received from the terminal and scrambles the second transmission signal using the specific scramble generation polynomial obtained from the received multiplex signal. The scramble signal is transmitted from the station to all the terminals. Receiving the scramble signal from the station, each terminal descrambles the scramble signal by using its specific scramble generation polynomial. If the received scramble signal has been scrambled using the same specific scramble generation polynomial, only the terminal can release the scrambling of the scramble signal.

The above and other objects, features and advantages of the present invention will become more apparent from the following description when taken in conjunction with the accompanying drawings in which a preferred embodiment of the present invention is shown by way of an illustrative example.

DETAILED DESCRIPTION OF THE PREFERRED EMBODIMENT

In what follows, an embodiment of the present invention will be described with reference to the accompanying drawings.

Figure 1:
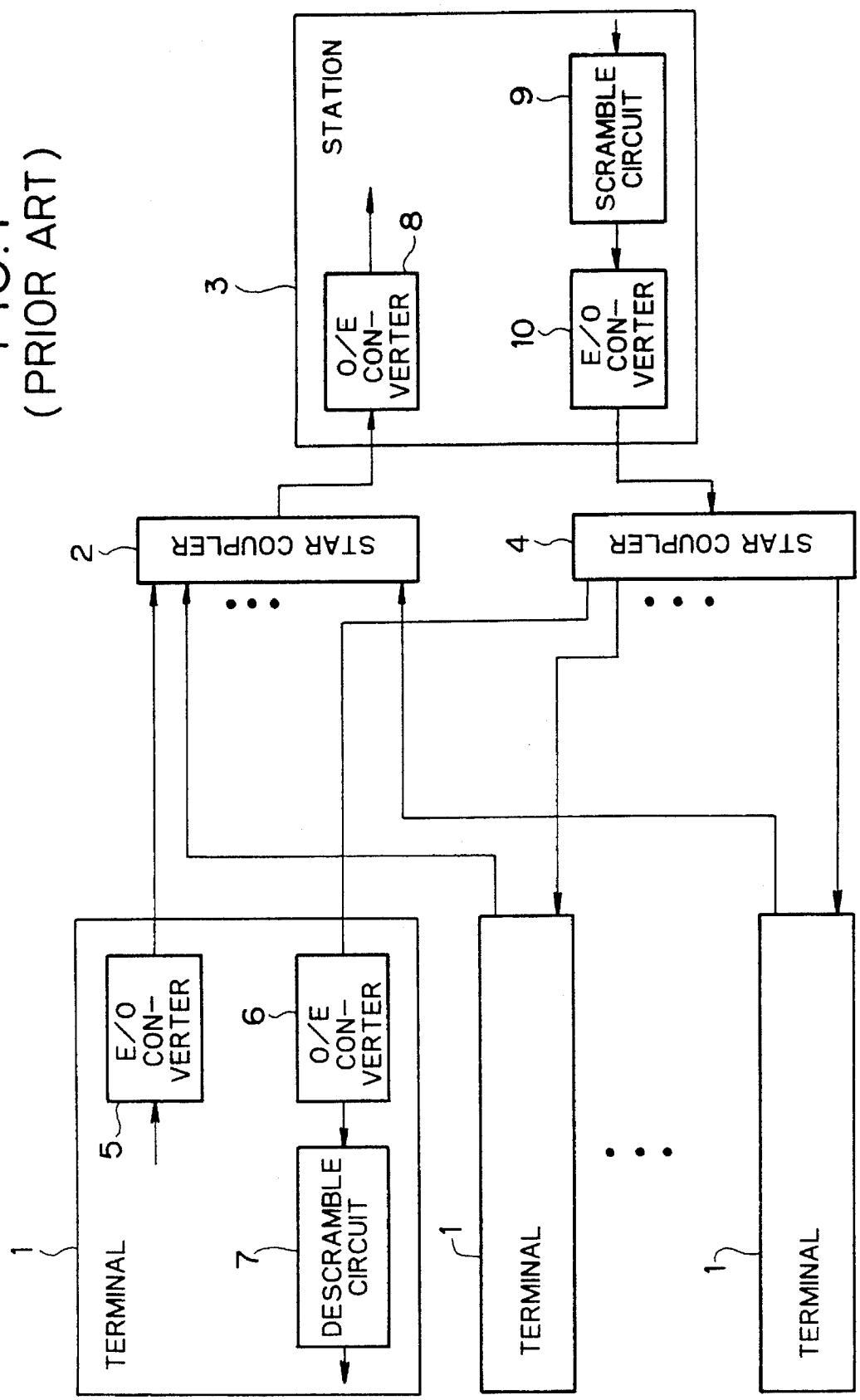
FIG. 1 is a block diagram illustrating the construction of a conventional scramble communication system.
Figure 2:
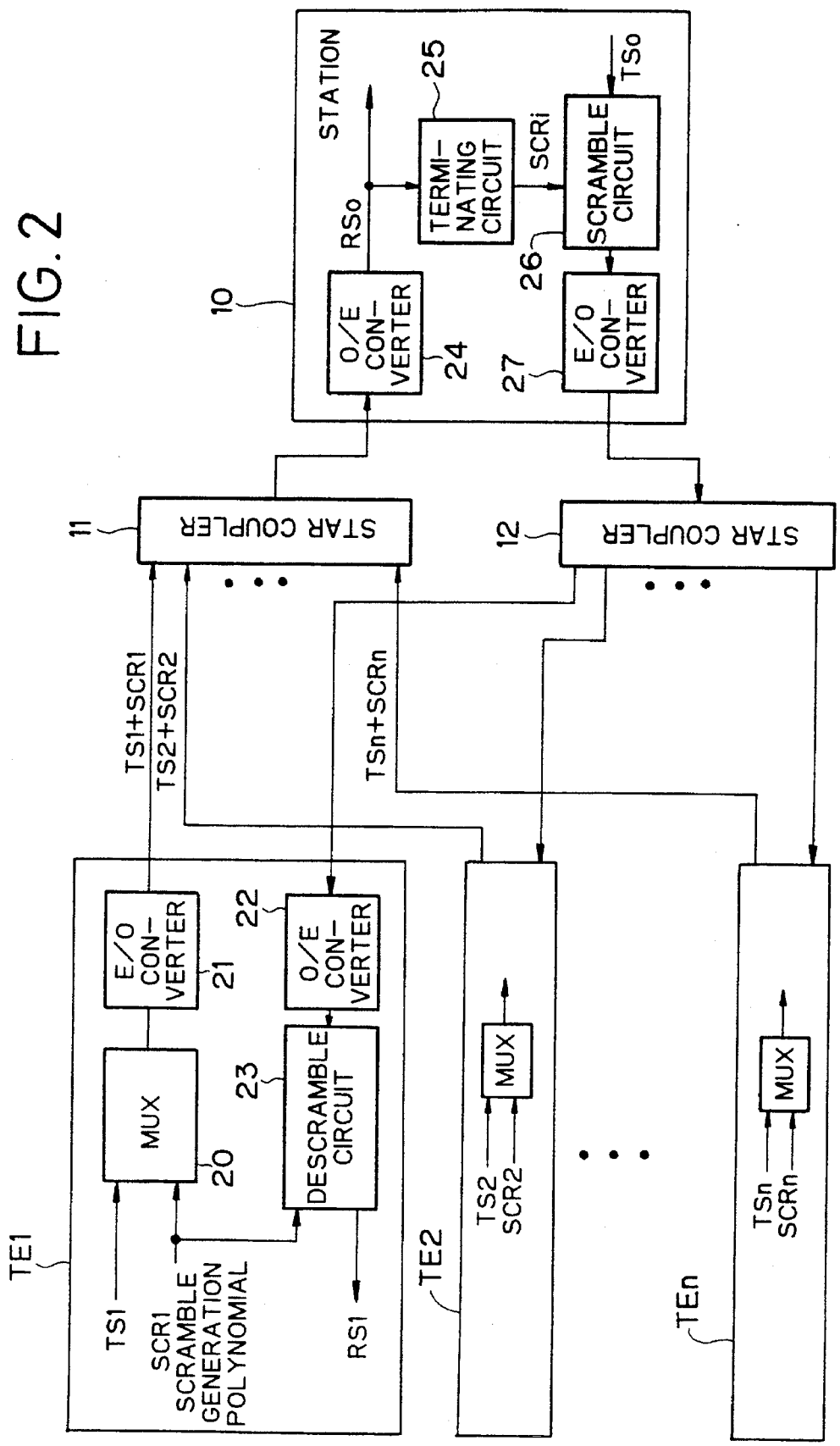
FIG. 2 is a block diagram illustrating the construction of an embodiment of a scramble communication system according to the present invention.

Referring to FIG. 2, two-way (or bi-directional) communication is achieved between n terminals TE1–TEn and a station 10 through star couplers 11, 12. More specifically, respective optical signals transmitted from the terminals TE1–TEn are combined through the star coupler 11 to be transmitted to the station 10. In contrast, an optical signal transmitted from the station 10 is distributed through the star coupler 12 to the terminals TE1–TEn.

In FIG. 2, although only the circuit construction of the terminals TE1 is illustrated, the other terminals TE2–TEn have the identical basic construction. Specific scramble generator polynomials SCR1–SCRn are previously set in the terminals TE1–TEn, respectively, and each scramble generator polynomial SCRi ($1 \leq i \leq n$) and transmission data TSi are multiplexed through a multiplexer 20. The multiplex signal (TSi+SCRi) is converted to an optical signal by an electric/optical converter 21 to be transmitted to the star coupler 11.

In contrast, an optical signal received from the station 10 is converted to an electric signal through an optical/electric signal converter 22 to be output to a descramble circuit 23. Using the scramble generator polynomial SCRi which was generated in this terminal TEi, the descramble circuit 23 releases the scrambling of the received signal to reproduce the received data RSi.

In the station 10, the optical signal received from the star coupler 11 is converted into an electric signal RSo by an optical/electric converter 24, and the received signal RSo is transferred to a terminating circuit 25. The terminating circuit 25, as described later, divides the received signal RSo into signals R1–Rn corresponding to the terminals TE1–TEn, respectively. The respective signals R1–Rn are demultiplexed into the signal TS1–TSn and the corresponding scramble generator polynomial SCR1–SCRn which were multiplexed in the respective terminals TE1–TEn as described above. Among the scramble generator polynomial SCR1–SCRn, a single scramble generator polynomial SCRi is selected and used to scramble the transmission data TSo by the scramble circuit 26. The scramble signal is converted to the optical signal by the electric/optical signal converter 27 to be transmitted to the star coupler 12. A detailed configuration of the station 10 will be described referring to FIG. 3.

Figure 3:
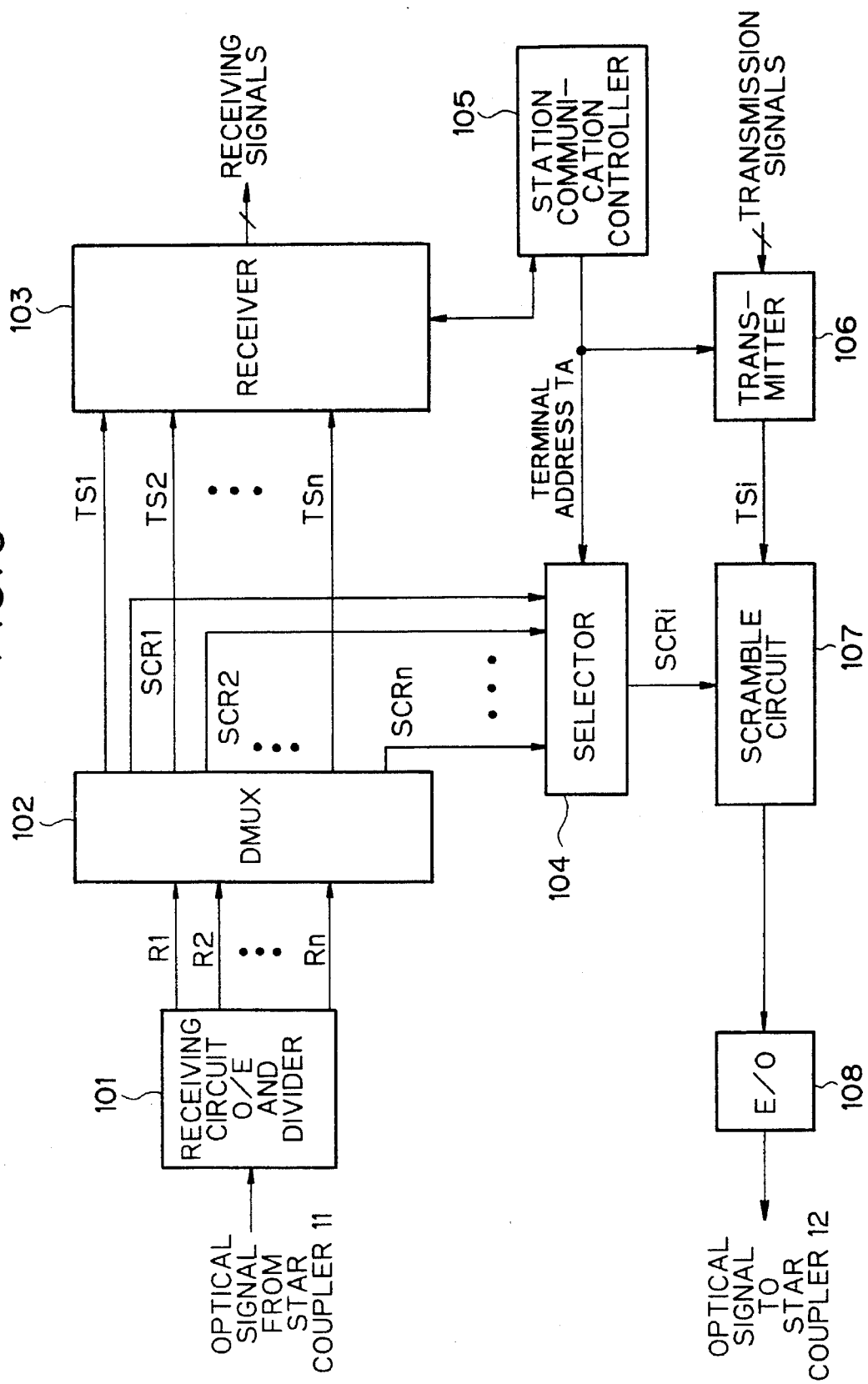
FIG. 3 is a detailed block diagram illustrating an exemplary configuration of the station according to the embodiment.

As illustrated in FIG. 3, the station 10 is comprised of a receiving circuit 101, a demultiplexer 102, a receiver 103, a selector 104, a station communication controller 105, a transmitter 106, a scramble circuit 107, and an electrical/ optical converter 108. The receiving circuit 101 converts the received optical signal into the received signals R1–Rn corresponding to the terminals TE1–TEn, respectively. The receiving circuit 101 is comprised of an optical/electric converter and a divider which are not shown in detail in FIG. 3 because they are known well. The demultiplexer 102 demultiplexes the respective signals R1–Rn into the signal TS1–TSn and the corresponding scramble generator polynomial SCR1–SCRn. The signal TS1–TSn are received by the receiver 103. The scramble generator polynomial SCR1–SCRn are input to the selector 104 where a single scramble generator polynomial SCRi is selected according to a terminal address TA received from the station communication controller 105. The transmitter 106 outputs a transmission signal TSi to the scramble circuit 107 according to the terminal address TA. The scramble circuit 107 scrambles the transmission signal TSi using the scramble generator polynomial SCRi and outputs the scramble signal to the star coupler 12 through the electrical/optical converter 108.

OPERATION

In the following, an entire operation of the present embodiment will be described taking as an example a bi-directional communication between the terminal TE1 and the station 10. In the terminal TE1, the multiplexer 20 multiplexes the specific scramble generator polynomial SCR1 and the transmission data TS1, and the multiplex signal is converted to the optical signal through the electric/ optical converter circuit 21.

The optical signal (TS1+SCR1) is transmitted from the terminal TE1 to the star coupler 11 where the optical signal (TS1+SCR1) is combined with other optical signals: (TS2+ SCR2) from the terminal TE2, (TS3+SCR3) from the terminal TE3, and so on. An optical signal output from the star coupler 11 is transmitted to the station 10.

After converting the optical signal into an electric signal, the terminating circuit 25 of the station 10 divides the received signal into the signals R1–Rn from which the signal R1 is selected and demultiplexed into the signal TS1 and the scramble generator polynomial SCR1. The station 10 generates a transmission data TSo according to the received signal TS1 of the terminal TE1. The scramble circuit 26 scrambles the transmission data TSo using the scramble generator polynomial SCR1 received from the terminating circuit 25. The electric/optical signal converter 27 converts the scramble signal to an optical signal which is in turn transmitted to the star coupler 12. The star coupler 12 distributes the optical signal received from the station 10 to all terminals TE1–TEn.

The same optical signal is entered into the terminals TE1–TEn where the optical signal is converted to an electric signal through the optical/electric converter 22. Since only the terminal TE1 uses the scramble generator polynomial SCR1, the descramble circuit 23 of the terminal TE1 can release the scrambling of the received signal from the station 10. For other terminals TE2–TEn, the scrambling of the same received signal cannot be released because they use the respective scramble generator polynomials SCR2–SCRn different from the scramble generator polynomial SCR1.

Accordingly, in this case, the received signal is correctly descrambled by the descramble circuit 23 of the terminal TE1 and the data RS1 received from the station 10 is reproduced. The same should be applied also for the cases of signal transmission to any of the other terminals. Therefore, selective communication between the station 10 and one of the terminals TE1–TEn is achieved with ensuring the secrecy of communication.

As described in detail above, the scramble communication system according to the present invention is applicable to any system wherein a bi-directional communication can be made between a station and a lot of subscriber terminals. For example, the present invention is applicable to a broadcasting system having a center office and a lot of subscriber terminals such as a bi-directional cable-television system. The present invention is also applicable to a computer communications system comprising a center office and a large number of subscriber terminals. In both systems, the respective subscribers can make communication in secrecy with the center office bi-directionally.

What is claimed is:

1. A communication system comprising:

a station;

a plurality of terminals connected to the station; each the terminal comprising:

multiplexing means for multiplexing a specific scramble generation polynomial with a first transmission signal to output a multiplex signal, each the terminal having the specific scramble generation polynomial different from each other;

first transmitting means for transmitting the multiplex signal to the station; and descrambling means for descrambling a scramble signal received from the station using the specific scramble generation polynomial, the station comprising:

receiving means for receiving the multiplex signal from each the terminal;

dividing means for dividing the multiplex signal into the specific scramble generation polynomial and the first transmission signal; and scrambling means for scrambling a second transmission signal by using the specific scramble generation polynomial to output the scramble signal; and second transmitting means for transmitting the scramble signal to all the terminals.

2. The communication system according to claim 1, wherein the scrambling means comprises:

a selector for selecting the specific scramble generation polynomial from the specific scramble generation polynomials which are respectively obtained from the multiplex signals by the dividing means, the multiplex signals being received from the terminals, respectively;

a controller for controlling the selector such that the specific scramble generation polynomial is selected according to a destination of the second transmission signal; and a scrambler for scrambling the second transmission signal by using the specific scramble generation polynomial.

3. The communication system according to claim 1, further comprising transferring means for transferring a signal bi-directionally from the station to all the terminals and from each the terminal to the station.

4. The communication system according to claim 3, wherein the transferring means comprises a first-directional transferring means for transferring a signal from each the terminal to the station and a second-directional transferring means for transferring a signal from the station to all the terminals.

5. The communication system according to claim 4, wherein the receiving means comprises:

a receiver for receiving a receiving signal from the first-directional transferring means; and a divider for dividing the receiving signal into the multiplex signal received from each of the terminal.

6. The communication system according to claim 3, wherein the receiving means in the station comprises:

a receiver for receiving a receiving signal from the transferring means; and a divider for dividing the receiving signal into the multiplex signal received from each the terminal.

7. A communication method for performing a bi-directional communication between a station and a plurality of terminals connected to the station, the method comprising the steps of:

multiplexing a specific scramble generation polynomial and a first-directional transmission signal to generate a multiplex signal in each the terminal, each the terminal having the specific scramble generation polynomial different from each other;

transmitting the multiplex signal from each the terminal to the station;

dividing the multiplex signal into the specific scramble generation polynomial and the first-directional transmission signal in the station;

scrambling a second-directional transmission signal by using the specific separated scramble generation polynomial to generate a scramble signal, the second-directional transmission signal being generated in accordance with the first-directional transmission signal in the station;

transmitting the scramble signal from the station to all the terminals; and descrambling the scramble signal received from the station by using the specific scramble generation polynomial provided in each the terminal.

8. The method according to claim 7, wherein the scrambling step comprises the steps of:

selecting the specific scramble generation polynomial from the specific scramble generation polynomials which are respectively obtained from the multiplex signals, the multiplex signals being received from the terminals, respectively;

controlling the selector such that the specific scramble generation polynomial is selected according to a destination of the second-directional transmission signal; and scrambling the second transmission signal by using the specific scramble generation polynomial.

9. The method according to claim 7, wherein the dividing step comprises:

receiving a receiving signal from the terminals;

dividing the receiving signal into, the multiplex signal received from each the terminal; and dividing the multiplex signal into, the specific scramble generation polynomial and the first-directional transmission signal.

* * * * *